United States Patent

Yoshikawa et al.

Patent Number: 5,476,121
Date of Patent: * Dec. 19, 1995

[54] LOW PERMEABLE RUBBER HOSE

[75] Inventors: Masato Yoshikawa, Kodaira; Hideyuki Niwa; Yukio Fukuura, both of Sayama; Kazuo Naito, Kawasaki, all of Japan

[73] Assignee: Bridgestone Corporation, Tokyo, Japan

[*] Notice: The portion of the term of this patent subsequent to Dec. 21, 2010, has been disclaimed.

[21] Appl. No.: 88,575

[22] Filed: Jul. 9, 1993

Related U.S. Application Data

[63] Continuation of Ser. No. 763,246, Sep. 20, 1991, abandoned.

[30] Foreign Application Priority Data

Sep. 25, 1990 [JP] Japan .................................. 2-254969

[51] Int. Cl.$^6$ .......................... F16L 11/12; F16L 11/10; F16L 11/04
[52] U.S. Cl. .................. 138/138; 138/143; 138/145; 138/127; 138/DIG. 10
[58] Field of Search ................... 138/DIG. 10, 138, 138/137, 143, 145, 127; 428/35.8, 35.9, 36.91, 465, 466, 457; 333/239; 148/519

[56] References Cited

U.S. PATENT DOCUMENTS

| | | | |
|---|---|---|---|
| 318,458 | 5/1885 | Fletcher | 138/DIG. 10 |
| 3,390,704 | 7/1968 | Woodell | 138/145 |
| 3,776,805 | 12/1973 | Hansen | 428/35.9 |
| 3,806,358 | 4/1974 | Glander et al. | 138/145 |
| 3,898,369 | 8/1975 | Clabburn | 138/145 |
| 3,968,198 | 7/1976 | Honda et al. | 264/343 |
| 4,211,822 | 7/1980 | Kurfman et al. | 428/412 |
| 4,241,129 | 12/1980 | Marton et al. | 428/412 |
| 4,469,729 | 9/1984 | Watanabe et al. | 138/118 |
| 4,733,800 | 3/1988 | Björkengren | 138/138 |
| 4,872,932 | 10/1989 | Yoshikawa et al. | 428/465 |
| 4,950,499 | 8/1990 | Martin et al. | 427/571 |

FOREIGN PATENT DOCUMENTS

| | | | |
|---|---|---|---|
| 0084088 | 7/1983 | European Pat. Off. | 138/137 |
| 0296105 | 12/1988 | European Pat. Off. | 138/137 |
| 0375608 | 6/1990 | European Pat. Off. | |

*Primary Examiner*—David Scherbel
*Assistant Examiner*—Tony G. Soohoo
*Attorney, Agent, or Firm*—Birch, Stewart, Kolasch & Birch

[57] ABSTRACT

A rubber hose comprising an inner tube of synthetic resin, a silver or silver alloy thin film sputtered or ion plated on the inner tube, and a rubber layer heat cured to the thin film through adhesive exhibits low gas and solvent permeability and high flexibility while maintaining such properties even on angular bending.

15 Claims, 2 Drawing Sheets

LOW PERMEABLE RUBBER HOSE

This application is a continuation of application Ser. No. 07/763,246 filed on Sept. 20, 1991, now abandoned.

This invention relates to a rubber hose having improved gas and solvent impermeability.

BACKGROUND OF THE INVENTION

In the prior art, rubber hoses were generally used in a wide variety of uses as automobile fuel feed hoses, torque converter hoses, power steering hoses, air conditioner hoses, refrigerator hoses, propane gas feed hoses, hydraulic hoses as well as household utility. A variety of media including water, oil, organic solvents, and gases are conducted through the rubber hoses. Therefore, the rubber hoses are required not only to be flexible, but also to be resistant to these transfer media and fully impermeable to organic gases and organic solvents.

In general, rubber surfaces do not always exhibit high resistance against chemical loads such as organic gases and organic solvents. Prior art approaches for improving the organic gas and solvent resistance of rubber included (1) to use a rubber material having different polarity from the solvent, (2) to increase the degree of crosslinking of rubber, (3) to increase the amount of filler added, and (4) to increase the amount of rubber used, that is, wall thickness. Approach (1) requires expensive rubbers such as chloroprene rubber, butadieneacrylonitrile rubber, acryl rubber, epichlorohydrin rubber, and fluororubber. Approach (2) detracts from softness and flexing resistance of rubber. Approach (3) is limited in conjunction with processability and physical properties. The solvent resistance is improved only in proportion to a volume fraction of the filler. As to approach (4), an increased wall thickness adds to product weight and cost and detracts from softness. In addition to these problems, either of these approaches fails to increase the organic gas and solvent resistance of rubber beyond a certain limit.

In order to enhance the performance and the gas and solvent resistance of rubber hoses, a number of proposals were made for composite resin-rubber hoses. Typically a thin resin layer is applied to the inside surface of a rubber hose to be in contact with a transfer medium. In the composite structure, the resin layer serves such functions as organic solvent resistance, gas impermeability, and chemical resistance while the outer rubber layer is responsible for hose's own functions such as softness and vibration absorption.

Composite rubber hoses are typically manufactured by coating a solvent soluble nylon film to the inside surface of a rubber hose as disclosed in Japanese Patent Application Kokai No. 113885/1985. Alternative methods are disclosed in Japanese Patent Publication Nos. 45302/1988 and 125885/1988 wherein a rubber hose is manufactured by extrusion coating a resin on a mandrel or shaping core for the hose to form a resin film. An adhesive is applied to the resin film. After drying, an intermediate rubber composition is coated, a reinforcing layer is braided, and an overcoating rubber layer is further coated. A final vulcanization shaping step completes a hose having improved organic gas and solvent resistance.

In the case of composite rubber hoses for accommodating coolant fluid for automobile air conditioners or the like, nylon resins are most often used as the resin forming the inner layer of the hose. A variety of nylon resins are used in practice including nylon 6, nylon 66, nylon 6/nylon 66 copolymer, nylon 11, nylon 12, nylon 4, copolymers thereof, modified ones, blends thereof, and blends of nylons and olefins.

The nylon used on the inner surface of rubber hoses for accommodating coolant fluid has to meet the following requirements.

(1) It is low permeable to Freon gas (gas impermeability).
(2) It is not susceptible to hydrolysis by moisture penetrating from without the hose (moisture resistance).
(3) It is resistant to heat.
(4) It withstands dynamic motion as in an impulse test.
(5) It is gas tight at a base or connector end.

With respect to these requirements, nylon 6, nylon 66, and nylon 6/nylon 66 copolymers are very low in Freon gas permeability, but relatively high in moisture permeability. In turn, nylon 11, nylon 12 and analogs are low in moisture permeability and less susceptible to hydrolysis, but moderately high in Freon gas permeability.

Some of these drawbacks may be eliminated by substituting a butyl rubber or Hypalon (chlorosulfonated polyethylene by E. I. duPont) having low moisture permeability for the rubber portion. The use of butyl rubber can reduce moisture permeation from the exterior. However, if the nylon layer contributing to Freon impermeability fails due to the presence of defects therein, such a failure would cause a serious failure of the entire hose because the butyl rubber layer is not self sustaining. In turn, the use of Hypalon is limited because it is expensive and difficult to bond.

Attempts have been made to blend nylon 6 or nylon 66 or a copolymer thereof having Freon gas impermeability with nylon 11 or nylon 12 having low moisture permeability or with olefin resins. These attempts improve moisture impermeability and hydrolysis resistance at the sacrifice of Freon gas impermeability.

Therefore, prior art combinations of rubber with nylons or the like were unsuccessful in fully satisfying the requirements of rubber hoses for transfer of coolant and similar fluids. It was thus proposed to wind a length of aluminum or copper strip or a length of plastic tape having such a metal thin film coated thereon around the outer periphery of a resinous inner tube, followed by coating a rubber layer thereon, or to form the inner surface of a rubber hose directly from a length of tape having a metal thin film coated thereon (see Japanese Utility Model Application Kokai Nos. 177620/1979, 198221/1979, 162379/1981, 94975/1983, 99582/1983, and 158879/1983, Japanese Patent Application Kokai No. 205144/1982, and Japanese Patent Publication No. 13812/1988).

These proposals take advantage of the barrier nature of a metal film to provide Freon and moisture impermeability, but suffer from various problems. Manufacture of these structures is complicated and thus expensive. When a length of metal foil or metallized tape is used, the seam between adjoining turns is simply a physical overlap. The turns can be displaced to form a gap therebetween under severe service conditions, resulting in a loss of the barrier nature of the metal thin film so that gas leakage can occur. Reduced softness is also a problem of these rubber hoses. Further, these methods generally use an adhesive in applying rubber on a metal foil or metallized tape wrap on a resinous inner tube to form a composite structure. The adhesive will undesirably lose its adhesive force upon contact with an organic solvent that has penetrated through the resinous inner tube.

To overcome these prior art problems, we previously proposed to coat a synthetic resin inner tube on the outer surface with a metal or metal compound by dry plating, as disclosed in Japanese Patent Application Kokai Nos. 209224/1990 and 209225/1990 (which corresponds to U.S. Pat. No. 5,271,977).

One of the important features of rubber hoses is flexibility because the rubber hoses are often bent angularly during service. When a rubber hose having an outer diameter of 20 mm and an inner diameter of 10 mm is rounded to a diameter of 100 mm, a strain of about 10% is applied to the hose at the inner surface. According to our study, strains of about 10% would induce cracking and crazing in general metals and metal compounds even in thin film form, which would thus lose their barrier nature. Although these metals and metal compounds are acceptable if hose service conditions such as bending radius are restricted, rubber hoses featuring flexibility are required to maintain gas impermeability even under extremely angular bends.

SUMMARY OF THE INVENTION

Therefore, an object of the present invention is to eliminate the above-mentioned drawbacks of prior art rubber hoses and to provide a novel and improved low permeable rubber hose of the composite structure including a resinous layer and a rubber layer in which solvent and moisture impermeability is improved without losing the softness characteristic of the rubber hose. Another object of the present invention is to provide such a composite rubber hose which is resistance against solvent and moisture and durable against strains by angular bending. A further object of the present invention is to provide such a composite rubber hose which can prevent an adhesive from losing its adhesive force.

According to the present invention, these and other objects are achieved by furnishing an inner tube of a synthetic resin having an outer peripheral surface, forming a thin film of silver or a silver base alloy on the outer surface of the inner tube, and heat curing a rubber layer to the thin film through an adhesive layer, thus integrating into a low permeable rubber hose.

We made efforts to solve the above-mentioned problems of a rubber hose of a composite structure having a synthetic resin inner layer and a rubber outer layer. A thin film of silver or a silver base alloy is formed on the outer peripheral surface of the inner tube by any desired plating. A rubber layer is heat cured to the thin film through an adhesive. Since this integral coverage of the rubber layer over the inner tube allows the silver or silver alloy thin film to maintain its barrier property to improve organic gas and moisture impermeability, the composite hose has improved solvent and moisture resistance without detracting from the softness characteristic of the rubber hose. Unlike the prior art method involving wrapping of metal or metallized tape, the silver or silver alloy thin film plated does not lose its barrier property so that the synthetic resin inner tube and the rubber layer can maintain their bond via the thin film even in an impulse test. The silver or silver alloy thin film can maintain its barrier property because it well accommodates strains caused by bends and twists so that no cracking occurs at strains as high as about 10%. There is thus obtained a low permeable rubber hose capable of withstanding angular bends. Since the adhesive layer is disposed outside the silver or silver alloy thin film having good barrier property, this configuration eliminates the problem found in the prior art rubber hose having metal or metallized tape wrapped on a resin inner tube that the adhesive will lose its adhesive force upon contact with an organic solvent that has penetrated through the resinous inner tube low permeable rubber hose of the invention can be continuously manufactured by means of existing installations in an efficient manner since it suffices to add the silver or silver alloy thin film forming step to the composite rubber hose manufacture process between the inner tube resin extrusion step and the adhesive application step.

BRIEF DESCRIPTION OF THE DRAWINGS

The above and other objects, features, and advantages of the present invention will be better understood from the following description taken in conjunction with the accompanying drawings, in which.

DESCRIPTION OF THE PREFERRED EMBODIMENTS

Figure 1:
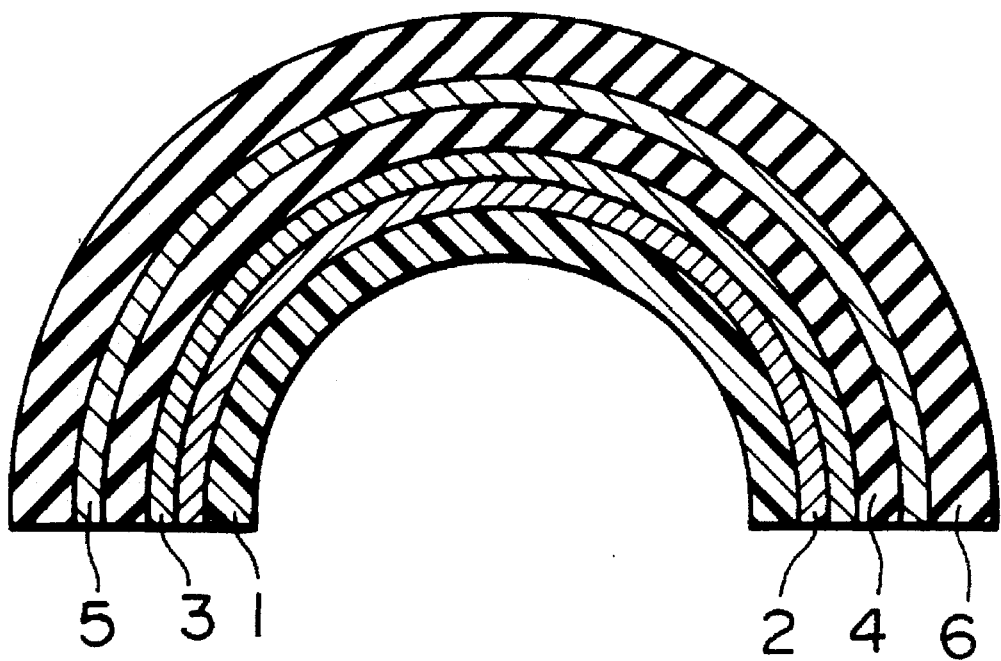
FIG. 1 is a transverse cross section of an upper half of a low permeable rubber hose according to one embodiment of the invention.

Referring to FIG. 1, there is illustrated in transverse cross section a low permeable rubber hose according to one embodiment of the present invention. The hose includes an inner tube 1 of a synthetic resin having an outer peripheral surface and an inner peripheral surface which is in direct contact with a fluid to be transferred through the hose. A thin film 2 of silver or silver base alloy is formed on the outer peripheral surface of the inner tube 1. An adhesive layer 3 and then a rubber layer 4 are coated onto the thin film 2 whereby the rubber layer 4 is bonded to the inner tube 1. A reinforcing layer 5 and a rubber sheath 6 are provided if desired. Thereafter the structure is heated and pressurized for vulcanization.

Resin Inner Tube

The low permeable rubber hose of the invention includes an inner tube of a synthetic resin. The synthetic resin of the inner tube may be suitably selected depending on the intended application of the hose. Since the silver or silver alloy thin film 2 provides a barrier layer which mitigates the burden imposed on the resin layer, the material may be selected from a wider variety of resins than in the prior art. Examples of the useful resin include polyoefins such as polyethylene, polypropylene polybutene-1, polyallylate, polyethylene terephthalate, polybutylene terephthalate, polyoxybenzoyl, etc.; nylons such as nylon 6, nylon 66, nylon 11, nylon 12, nylon 4, nylon 6/66, nylon 6/10, nylon 6/12, etc.; polyamides such as aromatic polyamides; polyethers such as polyacetal, polyphenylene oxide, polyether ether ketone, polyphenylene sulfide, etc.; polysulfones such as polysulfone, polyether sulfone, etc.; polyimides such as polyether imides, polyamide imides, polybismaleimides, etc. polycarbonate; fluoro resins such as polyvinyl fluoride, polyvinylidene fluoride, polytrifluoromonochloroethylene, etc.; various copolymers such as ethylene tetrafluoroethylene copolymers, hexafluoropropylene tetrafluoroethylene copolymers, and perfluoroalkoxytetrafluoroethylene copolymers; and thermoplastic urethane, polyvinyl chloride, polyvinylidene chloride, vinyl chloride/vinylidene chloride copolymers, crosslinked vinyl chloride resins, silicone resins, polyurethanes, and the like. These resins may be used alone or as a blend of two or more of the foregoing resins. Also employable are a blend of such a resin with another polyolefin and a blend of such a resin with an elastomer such as rubber.

Also useful are composite plastic materials comprising any of the foregoing resins and a reinforcement in the form of highly stiff inorganic fibers such as glass fibers, carbon fibers, boron fibers, silicon carbide and organic fibers such as Kevlar, an aromatic polyamide. Blends of any of the foregoing resins with carbon black, silica, calcium carbonate, clay, antioxidants or the like may also be used.

The inner tube may have a single layer structure or a laminate structure having two or more layers of the foregoing resin.

The inner tube may preferably have a wall thickness of from about 5 to about 300 μm, more preferably from about 10 about 100 μm. A wall of thinner than 5 μm is often difficult to form as a film and has insufficient barrier properties whereas a wall of thickner than 300 μm will sometimes lack softness.

Prior to formation of a silver or silver alloy thin film on the resin inner tube, a pretreatment, more particularly a wet or dry surface treatment is preferably carried out to activate the surface of the resin tube. The dry surface treatment may be either a mechanical treatment such as buffing or an electrical treatment such as corona discharge treatment, vacuum plasma treatment, and atmospheric plasma treatment. In the latter case, any surface treating gas may be used insofar a it can impart activity and wettability to the resin surface. Preferred surface treating gases include air, argon, oxygen, nitrogen, helium, carbon monoxide, carbon dioxide, carbon tetrafluoride, and the like alone or in admixture. The power source for generating an electric discharge may be any of those commonly used in electric discharge treatment including DC, AC, RF, and microwave power sources. Sputter etching is another useful pretreatment.

The wet surface treatment may be carried out in a conventional manner using mineral acids, organic halides or other agents.

Ag Thin Film

According to the invention, a thin film of silver or a silver base alloy is formed on the outer peripheral surface of the resinous inner tube. The silver base alloys used herein are silver alloys containing more than about 50% by weight of silver, preferably more than about 80% by weight of silver, for example, Ag—Au, Ag—Cu, Ag—Zn, Ag—Sb, and Ag—Cd. If desired, another metal, metal alloy or metal compound may be chosen to provide a multiplicity of layers.

The thickness of the silver or silver alloy thin film is not particularly limited although a thickness of from 10 Å to 10 μm, especially from 10 Å to 1 μm is preferred for adequate barrier property, efficient thin film production, and no impairment of rubber hose softness.

The silver or silver alloy thin films may be formed by any desired methods including wet plating methods such as electroless plating and electric plating and dry plating methods such as ion plating and sputtering, with the dry plating methods being preferred.

Electroless plating may be carried out in a conventional manner by forming catalytic metal nuclei such as metallic palladium or silver nuclei prior to electroless plating. If desired, electroless plating may,be followed by electric plating.

In the case of dry plating, sputtering and ion plating are preferred because closely bonding and crack-free films are obtained without losing the softness of rubber hoses. Any desired techniques may be employed for forming silver or silver alloy thin films by dry plating. Those skilled in the art will make a proper choice for dry plating with respect to operating parameters-associated with a dry, plating apparatus including ultimate vacuum, introduction of argon, oxygen and other gases, substrate temperature, and annealing. For ion plating, a proper choice may be made with respect to evaporation of a vapor source by resistance heating, induction heating, electron beam heating or the like, and ionization of vapor and acceleration of ionized vapor by RF plasma, DC voltage application, cluster beam, thermionic cathode mode or the like. Also for sputtering, a proper choice may be made of various sputtering modes including DC magnetron, bipolar DC, and RF sputtering. One illustrative dry plating method of forming silver alloy thin films is by providing a plurality of vapor sources which can be independently heated in a dry plating enclosure, and controlledly heating the respective vapor sources to evaporate different metals at desired rates for the alloy composition. In the case of sputtering, an alloy thin film may be formed using an alloy target or a plurality of different targets.

For continuously forming thin films on the synthetic resin inner tubes by dry plating, any desired sputtering method may be employed, for example, coaxial sputtering, and two or four side opposed sputtering. In the case of sputtering, plating efficiency can be improved by providing permanent magnets or electromagnets to establish a magnetic field transverse to the electric field on the target surface. In the case of ion plating, an object to be treated, that is, an inner tube is usually traversed above a plating source because it is difficult to place the plating source above the object to be treated.

The steps of pretreatment and dry plating on the outer peripheral surface of the resinous inner tube are preferably made consecutive for efficient production. For example, an inner tube is introduced through a differential evacuation system into a vacuum chamber where a surface treatment is carried out by a vacuum plasma or the like followed by dry plating of silver or silver alloy thin film.

The low permeable rubber hose of the invention is fabricated by forming a silver or silver alloy thin film on the outer periphery of the resinous inner tube, applying an adhesive thereto in a conventional manner, and applying a rubber layer thereto.

Adhesive

The adhesive used herein may be selected from those adhesives well known to form a bond between rubber and metal. Examples include isocyanate adhesives, phenol resin adhesives, adhesives based on chlorinated rubber derivatives, cyclized rubber adhesives, rubber latex/protein adhesives, and resorcin-formalin-rubber latex adhesives. The silver or silver alloy thin film may preferably be primed with a silane or titanate adhesive promoter prior to application of the adhesive because a consistent adhesive bond is accomplished.

Preferred among the above-mentioned adhesives are organic solvent system adhesives, for example, isocyanate adhesives such as triphenylmethane triisocyanate commercially available as Desmodur R® (Bayer A.G.) and diphenylmethane diisocyanate commercially available as Vulcabond TX® (I.C.I. Co.), a mixture of chlorinated rubber and a nitroso compound commercially available as Chemlok-220® (Durham Chemical) and Thixon-511® (Dayton. Chemical), and a mixture of an alkyl-modified phenol resin and nitrile rubber.

Also useful are aqueous dispersive adhesives, for example, a mixture of a resorcin-formalin precondensate and a rubber latex as well as those described in Japanese Patent Publication No. 24567/1974 and Japanese Patent Application Kokai No. 113882/1985.

Preferred examples of the silane adhesive promoters include γ-glycidoxypropyltrimethoxysilane, γ-mercaptopropyltrimethoxysilane, γ-aminopropyltriethoxysilane, γ-methacryloxypropyltrimethoxysilane, and vinyltriethoxysilane. Preferred examples of the titanate adhesive promoters include tetrabutyl titanate and tetraisopropyl titanate.

Rubber Layer

The rubber compound based to form the rubber layer according to the present invention may be natural rubber or a synthetic rubber having a carbon-to-carbon double bond in its structural formula alone or a blend of two or more rubbers.

Examples of the synthetic rubber used herein include homopolymers of conjugated dienes such as isoprene, butadiene, and chloroprene, for example, polyisoprene rubber, polybutadiene rubber, and plychloroprene rubber; copolymers of the conjugated dienes with vinyl compounds such as styrene, acrylonitrile, vinylpyridine, acrylic acid, methacrylic acid, alkyl acrylates, and alkyl methacrylates, for example, styrenebutadiene copolymer rubber, vinyl-pyridinebutadiene-styrene copolymer rubber, acrylonitrile-butadiene copolymer rubber, acrylic acid-butadiene copolymer rubber, methacrylic acid-butadiene copolymer rubber, methyl acrylate-butadiene copolymer rubber, and methyl methacrylate-butadiene copolymer rubber; copolymers of olefins such as ethylene, propylene and isobutylene with diene compounds, for example, isobutylene-isoprene copolymer rubber (IIR); copolymers of olefins with non-conjugated dienes (EPDM), for example, ethylene-propylene-cyclopentadiene terpolymers, ethylene-propylene-5-ethylidene-2-norbornene terpolymers, and ethylne-propylene-1,4-hexadiene terpolymers; polyalkenamers obtained by ring opening polymerization of cycloolefins, for example, polypentenamer; rubbers obtained by ring opening polymerization of oxysilane rings, for example, sulfur-vulcanizable polyepichlorohydrin rubber; and polypropylene oxide rubber. Halogenated products of the foregoing rubbers are also employable, for example, chlorinated isobutylene-isoprene copolymer rubber (Cl-IIR) and brominated isobutylene-isoprene copolymer rubber (Br-IIR). Ring opened polymers of norbornene may be used. Further useful are rubber blends, for example, blends of the foregoing rubbers with saturated elastomers such as epichlorohydrin rubber, hydrogenated, nitrile rubber, polypropylene oxide rubber, and chlorosulfonated polyethylene.

A rubber composition may be prepared by adding any desired additives to the rubber compound in accordance with an ordinary practice depending on a particular purpose and application intended for the rubber hose. The useful additives are fillers such as carbon black, silica, calcium carbonate, calcium sulfate, clay, diatomaceous earth, and mica; softeners such as mineral oils, vegetable oils, and synthetic plasticizers; vulcanization promoters such as stearic acid; antioxidants; crosslinking agents such as sulfur; adhesion promoters such as cobalt salts; and the like.

After the rubber composition is applied to the adhesive layer on the silver or silver alloy thin film on the inner tube, a braid may be applied for reinforcement and a rubber composition may be applied to form a jacket or sheath if desired. The resulting structure is then heated and pressurized in a conventional manner for vulcanization, accomplishing the formation of the rubber layer. To this end, either sulfur vulcanization or vulcanization with organic sulfur compounds such as dithiodimorpholine and thiuram type vulcanization may be used. The equipment for use in vulcanization may be selected from pressurized can equipment, fluidized bed equipment, and lead and plastic sheathed microwave curing equipment.

The low permeable rubber hose of the invention may be fabricated in accordance with the prior art method for fabricating synthetic resin-rubber composite hoses except that a silver or silver alloy thin film forming step is added thereto.

Figure 2:
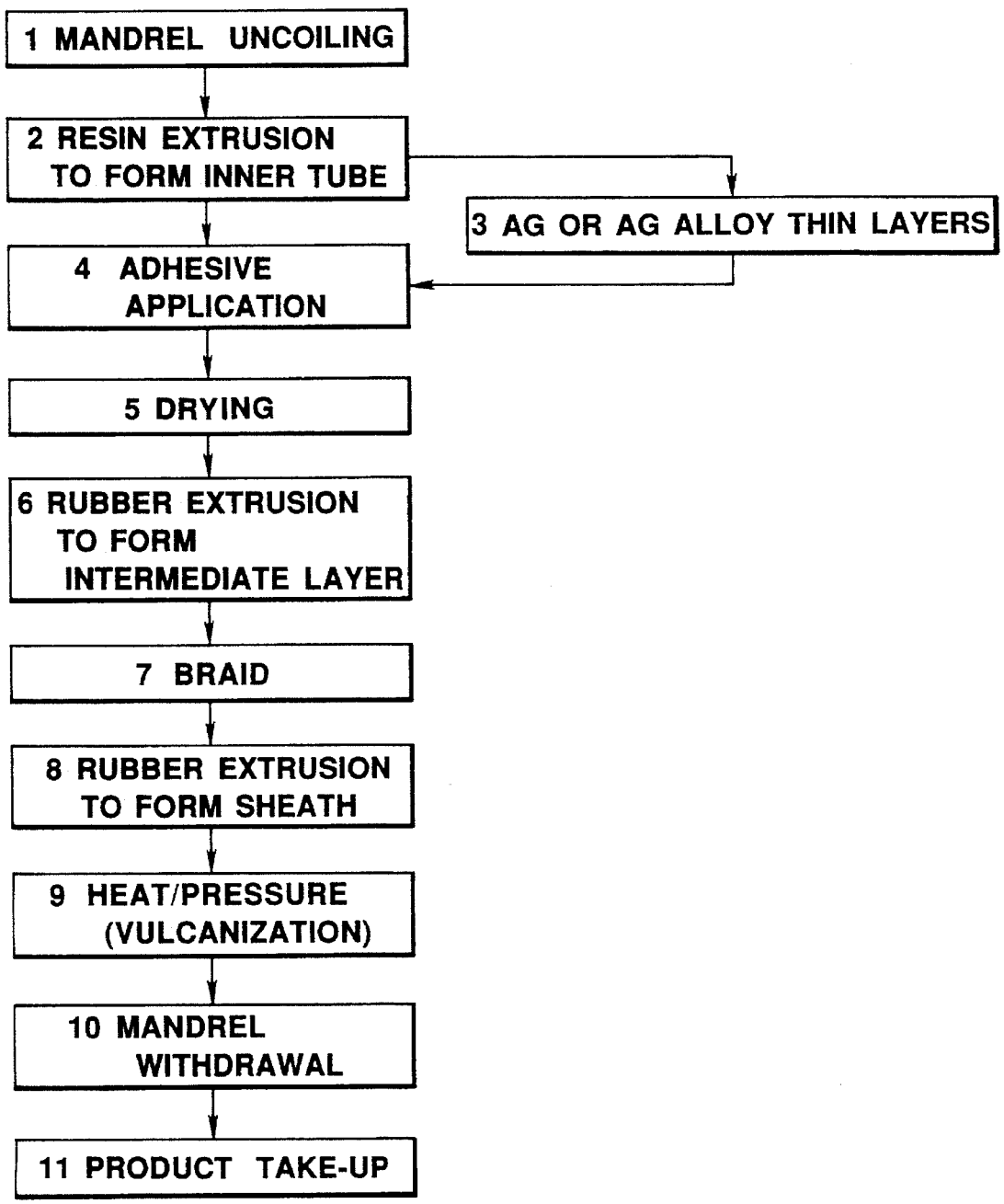
FIG. 2 is a diagram illustrating the steps in the manufacture of the rubber hose according to the present invention.

Referring to FIG. 2, the method for manufacturing the rubber hose according to the invention is described. In step (1), a mandrel or core of rubber, iron or plastic material is uncoiled. Step (2) is to coat the mandrel with a resin in an even thin film form to form a resin tube. Step (3) is to form a silver or silver alloy thin film on the outer periphery of the resin tube. Step (4) is to apply an adhesive to the thin film followed by drying in step (5). Step (6) is to extrude rubber to form a coaxial circular intermediate tube. Optional step (7) is to apply a braid of steel wire or organic fibers or, cords to the intermediate tube to form a reinforcing layer for reinforcement to withstand pressure and external forces Optional step (8) is to extrude rubber thereon to form a sheath. Step (9) is to apply heat and pressure to the resulting structure for vulcanization. The mandrel is removed from the vulcanized hose in step (10). The thus completed hose in finally taken up on a reel in step (11).

The low permeable rubber hose according to the invention may be fabricated in accordance with the conventional rubber hose manufacture method with a simple modification thereto by adding a silver or silver alloy thin film forming step (3) thereto. The existing rubber hose manufacture plant may be used without a substantial modification.

Since a silver or silver alloy thin film having barrier property is formed on the resinous inner tube and a rubber layer is formed on the thin film through an adhesive, the low permeable rubber hose of the invention exhibits improved solvent resistance, organic gas impermeability, moisture resistance, water resistance, and chemical resistance without a loss of the softness of rubber hose. It also possesses improved fatigue resistance and durability against strains caused by bending and twisting forces. Because of improved organic solvent resistance, organic gas impermeability, and moisture impermeability as well as maintained softness, the low permeable rubber hose of the invention finds a wide variety of uses as household hoses, hoses in fuel transfer, torque converter, power steering, and air conditioning systems of automobiles, hoses for refrigerant fluid transfer in air conditioners and refrigerators, natural and propane gas transfer hoses, hydraulic hoses, and rubber couplings.

EXAMPLE

Examples of the present invention are given below by way of illustration and not by way of limitation.

Example 1

A low permeable rubber hose according to the invention was manufactured by following the procedure shown in FIG. 2.

A mandrel was coated with a nylon 6/66 copolymer resin to a thickness of 50 μm and then introduced into a vacuum chamber through a differential evacuation system. The resin tube was surface treated by a vacuum plasma. The resin tube was then coated with a silver film to a thickness of 1,000 Å by magnetron sputtering. The silver coated resin tube on the mandrel was moved back to the ambient atmosphere through the differential evacuation system.

The metallized tube was then coated with a dilute solution of γ-glycidoxypropyltrimethoxysilane and then with an isocyanate adhesive, Desmodur R (Bayer A.G.). After drying, a rubber composition having the formulation shown in Table 1 was extruded on the tube to a thickness of 2 mm. A reinforcing fiber layer of 1 mm thick was braided on the rubber layer and a rubber composition having the same formulation was again extruded to form a sheath having a thickness of 1.5 mm. The structure was vulcanized at 145° C. for 40 minutes.

TABLE 1

| Ingredients | Parts by weight |
| --- | --- |
| Natural rubber | 85 |
| Styrene - butadiene rubber | 15 |
| Carbon black (FEF) | 45 |
| Mineral oil | 5 |
| Antioxidant* | 0.7 |
| Stearic acid | 0.5 |
| Zinc oxide | 5 |
| Vulcanization accelerator** | 0.8 |
| Sulfur | 2 |

*N-phenyl-N'-isopropyl-p-phenylenediamine (Ouchi Sinko K.K.)
**N-oxydiethylene-2-benzothiazole sulfamide (Ouchi Sinko K.K.)

For comparison purposes, a rubber hose designated Comparative Hose (1) was manufactured by the same procedure as above except that the dry plating step was omitted, that is, the silver film was not formed. Another rubber hose designated Comparative Hose (2) was manufactured by the same procedure as above except that an aluminum film was formed by dry plating (and adhesive was applied). Rubber hose samples were measured for Freon permeability and moisture permeability. The Freon permeability is expressed by the quantity (gram/m) of Freon 12 dissipated or volatilized from within the hose at 100° C. for 72 hours. The moisture permeability is expressed by the quantity (gram/m) of moisture absorbed in the hose at 60° C. and RH 95% for 72 hours. Further the quantities of permeating Freon and moisture were also measured under bent conditions where the hoses were bent at a radius of 200 mm, 100 mm, and 50 mm.

The results are shown in Table 2.

TABLE 2

| Hose belnding radius (mm) | Strain (%) | Example 1 Ag thin film | Comparative hose (1) No Ag film | Comparative hose (2) Al thin film |
| --- | --- | --- | --- | --- |
| Freon permeation (g/m) at 100° C./72 hours | | | | |
| no | 0 | 0.9 | 1.8 | 1.5 |
| 200 | 2.5 | 0.9 | 1.8 | 1.5 |
| 100 | 5.0 | 0.9 | 1.8 | 1.7 |
| 50 | 10.0 | 1.0 | 1.8 | 1.8 |
| Moisture permeation (g/m) at 60° C./ RH95%/ 72 hours | | | | |
| no | 0 | 0.3 | 3.0 | 1.5 |
| 200 | 2.5 | 0.3 | 3.0 | 1.6 |
| 100 | 5.0 | 0.3 | 3.0 | 1.9 |
| 50 | 10.0 | 0.4 | 3.0 | 2.3 |

As is evident from Table 2, the rubber hose having a silver thin film formed showed improved impermeability against Freon and moisture in straight form as compared with the hose without a silver thin film and the hose having an aluminum thin film formed.

In bent form, the hose having an aluminum thin film showed increasing Freon and moisture permeability as the bending radius was reduced (or strain was increased). In contrast, the hose having a silver thin film showed little change in Freon and moisture permeability even when the bending radius was reduced. At the end of measurement, the hoses were sectioned for observing the inner surface under a microscope. In the hose having an aluminum thin film, the aluminum film contained narrow cracks, which caused a loss of barrier property. No cracks were observed in the silver films of straight and bent hoses. The rubber hose of the invention which could maintain barrier property even at angular bends satisfied the requirements for automobile air conditioner hoses.

Example 2

A rubber hose was manufactured by the same procedure as in Example 1 except that the rubber composition coated on the silver thin film was changed to a nitrile rubber composition as shown in Table 3.

TABLE 3

| Ingredients | Parts by weight |
| --- | --- |
| NBR (acryl nitrile content 35%) | 100 |
| Liquid NBR | 10 |
| Carbon black (SRF) | 100 |
| Antioxidant* | 1 |
| Stearic acid | 0.5 |
| Zinc oxide | 1 |
| Vulcanization accelerator** | 2 |
| Vulcanization accelerator*** | 0.5 |
| Sulfur | 2 |

*Polymerized 2,2,4-trimethyl-1,2-dihydroquinoline (Ouchi Sinko K.K.)
**tetrabutylthiuram disulfide (Ouchi Sinko K.K.)
***dibenzothiazyl disulfide (Ouchi Sinko K.K.)

For performance evaluation, the hose was subjected to a gas permeation test (gas leakage test) and an impulse test.

The impulse test was a hydraulic pressure test in which the hose was charged with MIL 5606 oil at 100° C. and alternately pressurized to an internal pressure of 0 and 30 kg/cm² by means of a pump. The test included 150,000 cycles at a rate of 45 cycles/min. At the end of the test, the hose was disintegrated to examine any damage on the interior wall.

In the Freon permeation test, the rubber hose allowed only 1 gram of Freon 12 gas to permeate therethrough at 100° C. for 72 hours. In a vacuum test in which the hose interior was evacuated to a vacuum of 150 mmHg, it withstood the test without a separation between the nylon inner tube and the intermediate nitrile rubber layer. It also withstood the impulse test over 150,000 cycles.

The following reference examples illustrate the moisture resistance and Freon 12 permeation of synthetic resin/dry plated thin film laminates.

Reference Example 1

Disks having a diameter of 70 mm were cut from a nylon 6/66 copolymer film of 50 μm thick (manufactured by Ube Kosan K.K.).

The film disks on the surface were degreased with solvent. The disks were rested on a substrate holder in a magnetron sputtering apparatus. The chamber was evacuated to a vacuum of less than $10^{-5}$ Torr and then adjusted to a vacuum of 0.1 Torr by admitting a minor amount of argon gas. Then the film surface was cleaned by RF glow discharge at 13.56 MHz.

After cleaning, the RF glow discharge was ceased. With a DC voltage of −600 V applied to the metal target, sputtering was carried out in argon gas at a target current of 0.5 A, depositing a metal thin film on the film surface. The metals deposited herein were silver and aluminum and each had a thickness of 1,000 Å.

The film disks with or without metal thin films formed thereon were examined for moisture resistance by a moisture permeation cup test under strains of 0, 3, 7 and 13%. The test was by sealing a silica gel containing cup with the film disk, maintaining the cup at a temperature of 50° C. and a humidity of RH 90%, and measuring a weight gain of the silica gel in the cup, the weight gain being expressed in %.

The results are shown in Table 4.

TABLE 4

| Strain (%) | No metal film (%) | Ag thin film 1000 Å (%) | Al thin film 1000 Å (%) |
|---|---|---|---|
| 0 | 8.8 | 0.5 | 3.0 |
| 3 | 8.8 | 0.8 | 3.5 |
| 7 | 8.7 | 1.0 | 4.2 |
| 13 | 8.9 | 1.3 | 7.0 |

As seen from Table 4, moisture resistance was improved by dry coating plastic film with metal thin film. The silver coated plastic film showed improved moisture resistance and maintained it upon application of strains, as compared with the aluminum coated plastic film.

Reference Example 2

The plastic film used was a nylon 12 film of 100 μm thick (manufactured by Ube Kosan K.K.). As in Reference Example 1, silver and aluminum were deposited on the film disks to a thickness of 1,000 Å.

The film disks with or without metal thin films formed thereon were examined for Freon 12 permeation at 100° C. by a gas permeation tester (manufactured by Yanagimoto K.K.) under strains of 0, 3, 7 and 13%.

The results are shown in Table 5. The amount of Freon 12 permeated is expressed in ×$10^{-4}$ cc/cm$^2$.hr.

TABLE 5

| Strain (%) | No metal film | Ag thin film 1000 Å | Al thin film 1000 Å |
|---|---|---|---|
| 0 | 25 | 1 | 3 |

TABLE 5-continued

| Strain (%) | No metal film | Ag thin film 1000 Å | Al thin film 1000 Å |
|---|---|---|---|
| 3 | 25 | 1 | 5 |
| 7 | 25 | 1 | 9 |
| 13 | 25 | 1.5 | 15 |

As seen from Table 5, Freon 12 barrier property was improved by dry coating nylon 12 film with metal thin film. The silver coated plastic film showed Freon impermeability about 25 times improved over the control film. Upon application of strains, the aluminum coated plastic film showed increasing permeation in proportion of strain. In contrast, the silver coated plastic film maintained barrier property substantially unchanged upon application of strains, while its barrier property was markedly improved over the aluminum coated and uncoated plastic films.

Although some preferred embodiments have been described, many modifications and variations may be made thereto in the light of the above teachings. It is therefore to be understood that within the scope of the appended claims, the invention may be practiced otherwise than as specifically described.

We claim:

1. A low permeable rubber hose comprising:
   an inner tube of a synthetic resin having an outer peripheral surface and a thickness of 5 to 300 μm,
   a seamless thin film of silver or a silver alloy comprising greater than 80% by weight of silver on the outer peripheral surface of said inner tube with a thickness of 50 Å to 1 μm, and
   a rubber layer heat-cured to said thin film through an adhesive layer.

2. The rubber hose of claim 1 wherein said silver alloy is selected from the group consisting of Ag/Au, Ag/Cu, Ag/Zn, Ag/Sb or Ag/Cd.

3. The rubber hose of claim 1 wherein said synthetic resin contains a filler, a pigment, or an antioxidant or combinations thereof.

4. The rubber hose of claim 1 wherein said synthetic resin is selected from the group consisting of polyolefin, nylon, polyamide, polyether, polysulfone, polyimides, fluororesin, polyurethane, and silicone.

5. The rubber hose of claim 4 wherein said synthetic resins are reinforced with highly stiff fibers selected from the group consisting of glass, carbon, boron, silicon carbide and aromatic polyamide.

6. The rubber hose of claim 1 wherein said adhesive is an adhesive layer selected from the group consisting of isocyanate, phenol resin chlorinated rubber derivative, cyclized rubber, rubber latex-protein adhesive and resorcin-formalin adhesive.

7. The rubber hose of claim 6 wherein the adhesive is triphenylmethane triisocyanate.

8. The rubber hose of claim 1 wherein the rubber layer comprises a natural rubber, a synthetic rubber, or a blend of natural and synthetic rubbers.

9. The rubber hose of claim 8 wherein the rubber comprises a blend of natural rubber and styrene-butadiene rubber.

10. The rubber hose of claim 1 further comprising a reinforcing layer surrounding said rubber, heat-cured layer.

11. The rubber hose of claim 10 further comprising a rubber sheath surrounding said reinforcing layer.

12. A low permeable rubber hose comprising:

an inner tube of a synthetic resin having an outer peripheral surface and a thickness of 5 to 300 μm, a seamless thin film of silver or a silver alloy comprising greater than 80% by weight of silver on the outer peripheral surface of said inner tube with a thickness of 50 Å to 1 μm, and a rubber layer heat-cured to said thin film through an adhesive layer, said low permeable rubber hose having a gas permeability of about 1.0 g/m when dichlorodifluoromethane is filled in the hose at 100° C. for 72 hours and the hose is bent at a radius of 50 mm.

13. The low permeable rubber hose of claim 12, wherein said synthetic resin is a nylon 6/66 copolymer resin having a thickness of 50 μm and said seamless thin film is a silver thin film of 1000 Å thickness.

14. A low permeable rubber hose comprising:

an inner tube of a synthetic resin having an outer peripheral surface and a thickness of 5 to 300 μm;

a plated seamless thin film of silver or a silver alloy comprising greater than 80% by weight of silver on the outer peripheral surface of said inner tube with a thickness of 50 Å to 1 μm; and a rubber layer heat-cured to said thin film through an adhesive layer.

15. A low permeable rubber hose made by a method comprising:

(1) forming a synthetic resin tube having an outer peripheral surface and a thickness of 5 to 300 μm;

(2) plating said resin tube with silver or a silver alloy, comprising greater than 80% by weight of silver to form a seamless silver or silver alloy thin film with a thickness of 50 Å to 1 μm on the outer peripheral surface of said resin tube;

(3) applying an adhesive-coating to said silver or silver alloy thin film and drying said adhesive-coating;

(4) extruding a rubber-layer around said adhesive-coating; and (5) heat-curing said rubber-layer.

\* \* \* \* \*